Nov. 1, 1955  F. V. SILVESTRI ET AL  2,722,344
PAINT POT AND AIR FILTER
Filed March 1, 1952

INVENTORS.
FRANK V. SILVESTRI,
EDWARD J. LOEHNIS,
BY
ATTORNEY.

United States Patent Office 2,722,344
Patented Nov. 1, 1955

2,722,344

PAINT POT AND AIR FILTER

Frank V. Silvestri and Edward J. Loehnis, Torrance, Calif., said Silvestri assignor to said Loehnis Application March 1, 1952, Serial No. 274,472

4 Claims. (Cl. 222—183)

When paint is sprayed on to a surface, it is important that the air used for this spraying operation usually be clean, that is, moisture and dirt particles must be removed from the air stream.

An object of our invention is to provide a combination paint pot and air filter which will effectively remove entrained moisture and dirt from the air, this unit being simple and compact so that it can be readily moved from place to place as necessary.

Another object of our invention is to provide a novel combination air filter and paint pot so that the entire assembly can be moved from place to place, thus simplify the work of providing an adequate filter at a point adjacent to the paint container.

A feature of our invention is to provide a combination paint pot and air filter which will effectively and simply remove entrained moisture and dirt particles from the incoming air stream.

Other objects, advantages and features of our invention may appear from the accompanying drawing, the subjoined detailed description and the appended claims.

Figure 5:
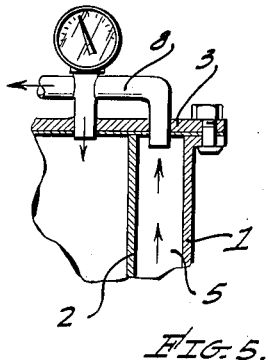
Figure 5 is a fragmentary sectional view taken on line 5—5 of Figure 2.
Figure 1:
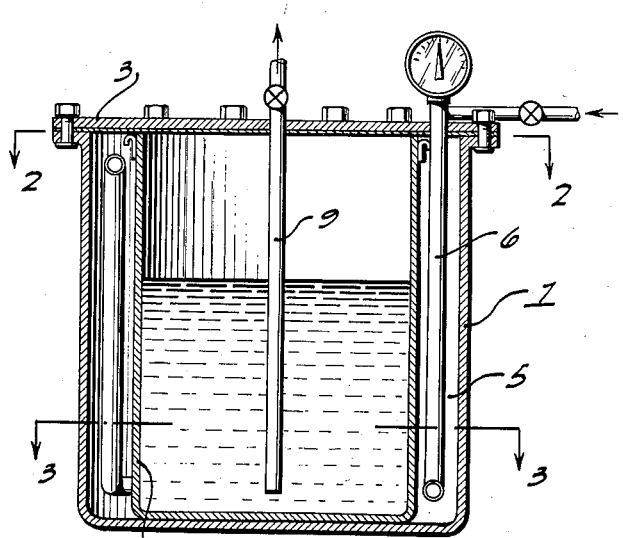
Figure 1 is a transverse sectional view of our paint pot and air filter.

Referring more particularly to the drawing, the numeral 1 indicates an outer housing or filter case, preferably formed of metal and circular in cross-section. Mounted within the case 1, we provide a paint pot 2, which is spaced from the wall of the case 1 and may be either fixedly mounted within the case 1 or it may be removable. A cover plate 3 is bolted or otherwise suitably attached to the top of the case 1 and this cover also seals the top of the pot 2. A plurality of radial ribs or fins 4 project inwardly from the case 1 and extend between the case 1 and the outer surface of the paint pot 2. These fins divide the annular space between the case 1 and the paint pot 2 into a plurality of compartments 5.

Figure 4:
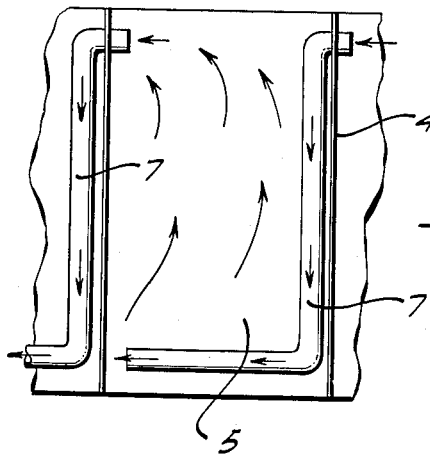
Figure 4 is a fragmentary sectional view taken in the direction of the lines 4—4 of Figure 2.
Figure 3:
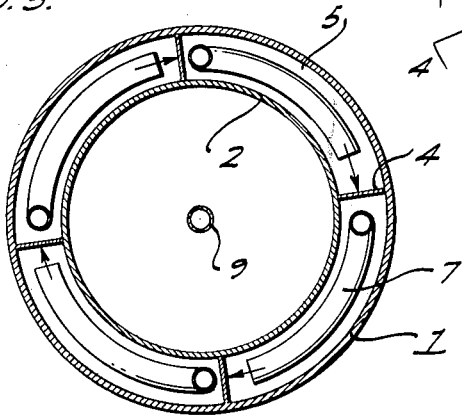
Figure 3 is a sectional view taken on line 3—3 of Figure 1.
Figure 2:
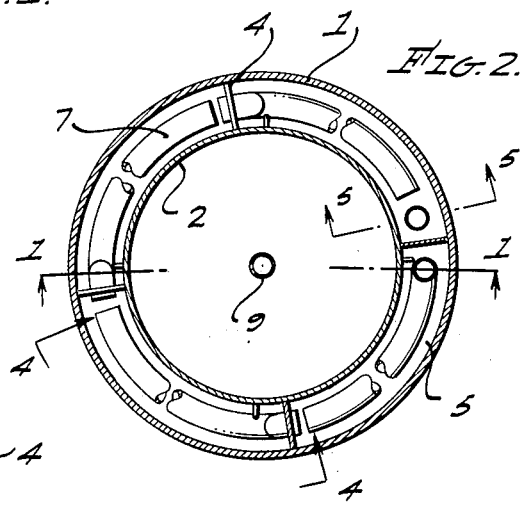
Figure 2 is a sectional view taken on line 2—2 of Figure 1.

Air is introduced into one of the compartments 5, through an intake pipe 6, and this pipe extends preferably through the cover 3, and thence downwardly to adjacent the bottom of one of the compartments 5. In each of the other compartments 5, we provide a conduit 7 which extends from the top of one of the fins 4 and extends through this fin, and thence is bent downwardly to adjacent the bottom of the compartment 5; this is shown in Figure 4. The air is thus conducted from the top of one compartment to the bottom of the adjacent compartment, and the air then strikes the face of one of the fins 4 and then flows upwardly to again enter one of the adjacent pipes 7. This tortuous path of the air, as well as causing the air to strike the flat face of the fin 4, will cause any entrained moisture and dirt particles to drop to the bottom of the compartment 5.

The air is finally moved through a fitting 8 from a compartment 5, into the paint pot 2, thus exerting pressure on the paint in this pot. The fitting 8 is mounted in the cover 3, substantially as shown in Figure 5. An outlet pipe 9 extends from the paint pot 2, through the cover 3, and thence to the spray gun. Air pressure to the spray gun is also provided by means of the fitting 8, all of which is usual and well known in the art.

It will be evident that the filter is moved from place to place with the paint pot 2, and, consequently, there is less likelihood of accumulating moisture and dirt particles in the air stream. The pipes 7 will remain in the filter portion of the case 1 at all times, however, the cover 3 can be removed, together with the intake pipe 6, the outlet pipe 9, and the fitting 8, thus enabling workmen to clean the paint pot 2.

Having described our invention, we claim:

1. A paint pot and air filter comprising an outer case, a paint pot within said case and spaced inwardly from the wall of said case the wall of the paint pot and the outer case forming an annular space there between, a plurality of radial fins extending between said case and said paint pot, said fins forming arcuate compartments between the case and the paint pot, an air conduit extending from adjacent the top of each of said fins and thence into the adjacent compartment, said conduits extending downwardly to adjacent the bottom of each compartment, a cover mounted on said case and extending over said case and said paint pot, an air intake pipe extending through the cover and into one of said compartments and a pipe fitting extending from one of said compartments into the paint pot to conduct air into said paint pot, and a paint outlet pipe extending through said cover from said paint pot.

2. A paint pot and air filter comprising an outer case, a paint pot within said case and spaced inwardly from the wall of said case, the wall of the paint pot and the outer case forming an annular space therebetween, a cover closing the top of said case and said paint pot, radial fins extending between said case and said paint pot, said fins forming arcuate compartments between the case and the paint pot, air pipes extending from one compartment into the adjacent compartment and projecting through said fins, the air pipes conducting all of the air from one compartment to the adjacent compartment, and a pipe fitting extending from one of said compartments into the paint pot to conduct air into said paint pot, and an air intake pipe extending into one of said compartments.

3. A paint pot and air filter comprising an outer case, a paint pot within said case and spaced inwardly from the wall of said case, the wall of the paint pot and the outer case forming an annular space therebetween, a cover closing the top of said case and said paint pot, radial fins extending between said case and said paint pot, said fins forming arcuate compartments between the case and the paint pot, air pipes extending from one compartment into the adjacent compartment and projecting through said fins, said pipes extending from adjacent the top of one fin and extending downwardly to adjacent the bottom of a compartment, the air pipes conducting all of the air from one compartment to the adjacent compartment, and a pipe fitting extending from one of said compartments into the paint pot to conduct air into said paint pot, and an air intake pipe extending into one of said compartments.

4. A paint pot and air filter comprising an outer case, a paint pot within said case and spaced inwardly from the wall of said case, the wall of the paint pot and the outer case forming an annular space therebetween, a cover closing the top of said case and said paint pot, radial fins extending between said case and said paint pot, said fins forming arcuate compartments between the case and the paint pot, air pipes extending from one compartment into the adjacent compartment and projecting through said fins, an air intake pipe extending through the cover and into one of said compartments, a paint outlet pipe extending from the paint pot and through said cover, the air pipes conducting all of the air from one compartment to the adjacent compartment, and a pipe fitting extending from one of said compartments into the paint pot to conduct air into said paint pot, and an air intake pipe extending into one of said compartments.

References Cited in the file of this patent

UNITED STATES PATENTS

| | | |
|---|---|---|
| 441,628 | Coon et al. | Nov. 25, 1890 |
| 872,027 | Stare | Nov. 26, 1907 |
| 1,915,123 | Downs | June 20, 1933 |